(12) United States Patent
Klos

(10) Patent No.: US 11,733,454 B2
(45) Date of Patent: Aug. 22, 2023

(54) HOMOGENIZATION OF THE OUTPUT BEAM PROFILE OF A MULTIMODE OPTICAL WAVEGUIDE

(71) Applicant: TOPTICA Photonics AG, Gräfelfing (DE)

(72) Inventor: Thomas Klos, Munich (DE)

(73) Assignee: TOPTICA Photonics AG, Gräfelfing (DE)

(*) Notice: Subject to any disclaimer, the term of this patent is extended or adjusted under 35 U.S.C. 154(b) by 0 days.

(21) Appl. No.: 17/411,213

(22) Filed: Aug. 25, 2021

(65) Prior Publication Data
US 2022/0066097 A1    Mar. 3, 2022

(30) Foreign Application Priority Data
Aug. 25, 2020   (DE) .......................... 102020122227.0

(51) Int. Cl.
*G02B 6/12*        (2006.01)
*G02B 27/09*       (2006.01)

(52) U.S. Cl.
CPC ..... *G02B 6/12004* (2013.01); *G02B 27/0994* (2013.01); *G02B 2006/1215* (2013.01); *G02B 2006/12142* (2013.01)

(58) Field of Classification Search
CPC ............ G02B 6/12004; G02B 27/0994; G02B 2006/12142; G02B 2006/1215; G02B 6/30; G02B 27/0172; G02F 1/225; G02F 1/3132; G02F 1/0147
See application file for complete search history.

(56) References Cited

U.S. PATENT DOCUMENTS

| 5,224,200 | A |   | 6/1993 | Rasmussen et al. |
| 5,535,293 | A | * | 7/1996 | Buchin .................. G02B 26/04 250/227.21 |

FOREIGN PATENT DOCUMENTS

| JP | 59-024823 | 2/1984 |
| JP | 2008-224889 | 9/2008 |

* cited by examiner

*Primary Examiner* — John Bedtelyon

(57) ABSTRACT

The invention relates to a method for homogenization of the output beam profile of a multimode optical waveguide (10). The method comprises the following method steps:
splitting input radiation (2) of coherent light over two or more beam paths (I-IV),
modulating the radiation in at least one of the beam paths (I-IV),
combining the beam paths (I-IV) by superimposing the modulated radiation onto the input (9) of the multimode waveguide (10), where the radiation forms a temporally variable interference pattern, and
propagating the radiation using the multimode waveguide (10).

The invention furthermore relates to a device for carrying out the method. At least one splitting device (14) which is designed to split input radiation (2) over two or more beam paths (I-IV), at least one modulator (16) which is designed for modulating the radiation in at least one of the beam paths (I-IV), and at least one superimposition device which is designed for combining the beam paths (I-IV) by superimposing the modulated radiation and for directing the superimposed radiation onto the input (9) of the multimode optical waveguide (10), are components of a photonic integrated circuit (3) according to an embodiment of the device.

20 Claims, 2 Drawing Sheets

HOMOGENIZATION OF THE OUTPUT BEAM PROFILE OF A MULTIMODE OPTICAL WAVEGUIDE

RELATED APPLICATION(S)

This application claims the benefit of priority of Germany Patent Application No. 102020122227.0 filed on Aug. 25, 2020, the contents of which are all incorporated by reference as if fully set forth herein in their entirety.

FIELD AND BACKGROUND OF THE INVENTION

The invention relates to a method for homogenization of the output beam profile of a multimode optical waveguide. The invention furthermore relates to an optical device for carrying out the method.

While during use of single-mode optical waveguides (e.g. single-mode fibers) for transmitting coherent light (laser radiation) the output beam profile is always perfectly Gaussian-shaped, in the case of propagation of coherent radiation through transversal multimode waveguides (e.g. multimode fibers, referred to for short in the following as MMF) a highly structured, i.e. inhomogeneous, beam profile results at the output, on account of the plurality of possible propagation modes and the interference thereof.

At the same time, there are numerous applications, e.g. in the field of illumination and laser-based material machining, in which MMFs are used for transferring the radiation from a light source (laser) to the site of use (sample, detector). In these applications, a homogeneous distribution of the light is extremely important, in order for example to uniformly illuminate photosensitive samples, layers, or image detectors (in cameras). Wide field fluorescence microscopy can be cited as a specific example, in the case of which a large surface has to be illuminated as homogeneously as possible. A homogeneous beam profile is also important in the field of use of material machining, since the quality (uniformity) of the removal depends directly on the homogeneity of the laser beam profile.

When using MMF having a special geometry of the fiber core (e.g. rectangular), it is furthermore possible to achieve what is known as a top hat beam profile, in which the beam profile is not Gaussian-shaped, but rather flat over wide regions.

It is known from the prior art that the homogeneity of the output beam profile can be improved e.g. by vibrating the MMF. The mechanical vibrations have a dual effect: They change the geometry of the coupling of the radiation into the MMF, as a result of which the illumination of the different spatial modes varies. Furthermore, the vibrations bring about mode mixing due to transit time differences within the MMF, which causes some of the radiation of one mode to be coupled into another, while the radiation propagates within the MMF. Consequently, the interference pattern of the propagating modes varies in a temporal manner. The corresponding temporal integration in the case of the detection of the radiation in the relevant application (e.g. by a suitable selection of the exposure time when recording an individual image in microscopy) results in a homogeneous beam profile on account of the averaging of the temporally varying patterns.

A further known solution consists in placing a mechanically movable diffusor at the coupling end of the MMF. As a result of this, too, temporally varying interference patterns are generated in the output beam, which in turn allows for homogenization by temporal averaging. A movable diffusor can be implemented for example by means of a rotating diffusing screen. WO 2010/086336 A1 describes the use of a vibrating mirror diaphragm which reflects the input radiation onto the coupling end of the MMF.

U.S. Pat. No. 5,224,200 A describes a laser beam homogenizer in which a coherence delay line is used. In this case, a coherent input beam is divided into a plurality of components, each of which has a path length difference which is equal to a multiple of the coherence length with respect to the other components. The components recombine incoherently at the output of the homogenizer, and the resulting beam has a more uniform spatial intensity which is suitable for microlithography and laser pantography. A homogenizer having a variable aperture and a liquid-filled homogenizer are also disclosed.

JP 2008-224 889 A relates to reducing speckle formation on the emission surface of an optical fiber without loss and reduction of the coherence. The device proposed for this purpose comprises a laser light source which delivers coherent light, a light splitter means which consists of one or more beam splitters and one or more total reflection mirrors, and is used for splitting a light beam from the laser light source into a plurality of light beams along the emission axis of the light source. Furthermore, an optical fiber for homogenizing an incident light beam is provided, and a condenser lens through which a plurality of light beams, which are output by the light splitter means, are combined on the incident surface of the optical fibers, at different angles.

JP S59-24 823 A also relates to the elimination of speckles. For this purpose, the use of an ultrasound deflection element as an optical axis changing element is proposed. Is a high-frequency signal is applied to the ultrasound deflection element by an oscillator, a laser light which passes through the element is deflected by the intensity of the high frequency. The deflected light is conducted through a lens to an input connection surface of an optical fiber. If, at this time point, the frequency of the high frequency of the oscillator is slightly changed, the direction of the deflected light is also slightly changed, and the beam focus on the input connection surface of the optical fiber is changed. Consequently, if the high frequency of the oscillator undergoes frequency modulation using triangle waves, the beam focus is moved in an oscillating manner on the input connection surface of the optical fiber, and thus the influence of speckles is eliminated.

SUMMARY OF THE INVENTION

The object of the invention is that of providing a simple, compact and reliably functioning solution for homogenization of the output beam profile of a multimode optical waveguide.

For this purpose, the invention proposes a method which comprises the following method steps:
- splitting input radiation of coherent light into two or more beam paths,
- modulating the radiation in at least one of the beam paths,
- combining the beam paths by superimposing the modulated radiation onto the input of the multimode waveguide, where the radiation forms a temporally variable interference pattern, and
- propagating the radiation using the multimode waveguide.

The approach of the invention consists in splitting the radiation, prior to coupling into the MMF, over two or more separate beam paths (e.g. in the form of optical waveguide portions or in the form of free beam paths). At the coupling point, i.e. at the input of the MMF, temporally varying interference patterns are generated in that the radiation undergoes different temporal modulation in different beam paths. In this case, the varying interference patterns occur in that the different beam paths are combined again after modulation and brought into interference with one another at the input of the MMF. On account of the temporally varying interference patterns, the position and angle of the radiation to be coupled into the MMF change over time, as a result of which the excitation of the different modes varies accordingly. Consequently, the interference pattern of the modes propagating during the propagation of the radiation through the MMF also varies in a temporal manner. Temporal integration during the detection of the radiation coupled out of the MMF results in a homogeneous beam profile on account of the averaging of the temporally varying patterns. In this case, the homogeneity achieved can be optimized by the temporal modulation pattern in the beam paths. The interference patterns generated should be as uncorrelated as possible, in order for the possible excitation patterns in the MMF to be passed through as "ergodically" as possible, over time.

Preferably, the radiation is coupled out of the MMF as an output beam after propagation of the radiation through the MMF.

In a preferred embodiment of the method the modulation is wavelength modulation, i.e. phase modulation. The mutually independent temporal modulation of the phase in the different beam paths makes it possible for the spatial interference pattern generated at the input of the MMF to be directly influenced and temporally varied. Intensity modulation would also be conceivable, as an alternative or in addition, for varying the interference pattern.

In addition, it is possible to temporally vary the ratio of the splitting of the input beam over the different beam paths. The temporal variation of the ratios of the radiation power propagating over the different beam paths also makes it possible for the temporal interference pattern at the input of the MMF to be varied. As a result, the variety of interference patterns which can be generated is increased accordingly, and thus the quality of the homogeneity in the output beam, achievable by averaging.

In typical applications, the modulation frequency and/or the frequency of the variation of the splitting ratio should be at least 100 Hz, preferably at least 1 kHz, particularly preferably at least 10 kHz. In particular, the modulation frequency and/or the frequency of the variation of the splitting ratio should be larger than the inverse integration time of a detector which acquires the output beam, e.g. the exposure time of an image sensor of a camera for recording an individual image in wide field microscopy.

The invention furthermore proposes an optical device for carrying out the method described above, comprising
- a splitting device which is designed to split input radiation of coherent light over two or more beam paths,
- at least one modulator which is designed for modulating the radiation in at least one of the beam paths,
- a multimode optical waveguide, and
- a superimposition device which is designed for combining the beam paths by superimposing the modulated radiation and for directing the superimposed radiation onto the input of the multimode waveguide, where the radiation forms a temporally variable interference pattern.

Furthermore, an outcoupling optics is preferably provided, which is designed to couple the radiation out of the multimode optical waveguide, after propagation therethrough, as an output beam. Optionally, the radiation emerging from the MMF without use of special outcoupling optics can be used directly.

In a preferred embodiment, the splitting device, the at least one modulator, and at least parts of the superimposition device are components of a photonic integrated circuit. The photonic integrated circuit (referred to in the following for short as PIC) is an integrated optical system in which photonic (and optionally additional electronic) elements (optical waveguides, beam splitters, filters, modulators) are accommodated on a common substrate. A PIC is characterized by a high level of functionality and compactness.

The splitting device is expediently formed by an optical waveguide structure of the PIC. Optical waveguides are generated in the (transparent) substrate of the PIC by purposeful local refractive index modification. In this case, the splitting device can be formed simply by beam splitters or, preferably, by one or more electrically actuatable, integrated directional couplers which are arranged one behind the other in the beam path and/or are connected in parallel. Electrically controllable directional couplers advantageously allow for the temporal variation of the power distribution over the different beam paths by means of corresponding electrical actuation, by making use of electro-optic or thermo-optic effects which act on the light guidance in the integrated optical waveguide structure of the PIC.

The two or more beam paths of the optical device can advantageously also be formed, in each case, by an integrated optical waveguide portion of the PIC. The modulation of the beam paths propagating over the different beam paths can then be achieved, again in an electrically actuated manner, by making use of electro-optical, electromechanical, or thermo-optical effects. For example, each of the beam paths may comprise a phase modulator as a modulator, which phase modulator is formed by an integrated electrical resistance heating member of the PIC which is associated with the relevant optical waveguide portion. The resistance heating member acts locally on the optical waveguide portion (or a part thereof) and generates, there, a thermal variation of the refractive index and thus of the optical path lengths, depending on the electrical current flowing. As a result, the phase of the radiation propagating along the beam path, i.e. through the optical waveguide portion, is influenced. The modulation of the heater current is converted into a corresponding phase modulation of the radiation. On account of the miniaturized design and the correspondingly low heat capacity of the components integrated in the PIC the modulation frequency can be comparatively high, in particular in the range specified above, of over 1 kHz or even over 10 kHz.

A controller which is electrically connected to the photonic integrated circuit is expediently provided, which controller is designed to actuate the at least one directional coupler and/or the electrical resistance heating members of the phase modulators. For this purpose, the controller is connected e.g. at an electrical interface of the PIC which is provided therefor.

The superimposition device of the optical device can advantageously comprise an arrangement of two or more exit apertures (e.g. mirrors, diffraction gratings, edge emitters) integrated in the PIC, wherein each of the beam paths is associated, in each case, with an exit aperture which couples the radiation at the end of the optical waveguide portion of the relevant beam path out of the PIC and directs it to the coupling end, i.e. the input, of the MMF (optionally using suitable coupling optics). There, the radiation of the different beam paths is brought into interference, in order to generate temporally variable interference patterns according to the invention. The exit apertures can advantageously be integrated as micromirrors (dimension of the mirror arrangement of less than 100 μm) or as gratings embedded in the optical waveguide portions for coupling out of the plane of the PIC. The mirrors can be incorporated into the substrate of the PIC, by means of conventional manufacturing technology (e.g. by means of focused ion beam), as boundary surfaces which are inclined obliquely to the plane of the PIC, such that the radiation propagating along the optical waveguide portion undergoes total internal reflection at the boundary surface and is coupled out of the PIC at an angle to the substrate plane.

The multimode waveguide, i.e. the MMF, preferably has a mode field diameter of at least 20 μm, preferably at least 50 μm, particularly preferably at least 100 μm. If the mode field diameter of the MMF is larger than the dimensions of the integrated mirror arrangement of the PIC, the coupling of the radiation into the MMF can take place directly, i.e. without coupling optics. For this purpose, it is merely necessary for the coupling end of the MMF to be brought sufficiently close to the mirror arrangement, such that as far as possible the entire exit light cone of the radiation coupled out of the PIC strikes the core region of the MMF.

BRIEF DESCRIPTION OF THE SEVERAL VIEWS OF THE DRAWINGS

Exemplary embodiments of the invention will be explained in greater detail in the following, with reference to the drawings, in which.

DESCRIPTION OF SPECIFIC EMBODIMENTS OF THE INVENTION

Figure 1:
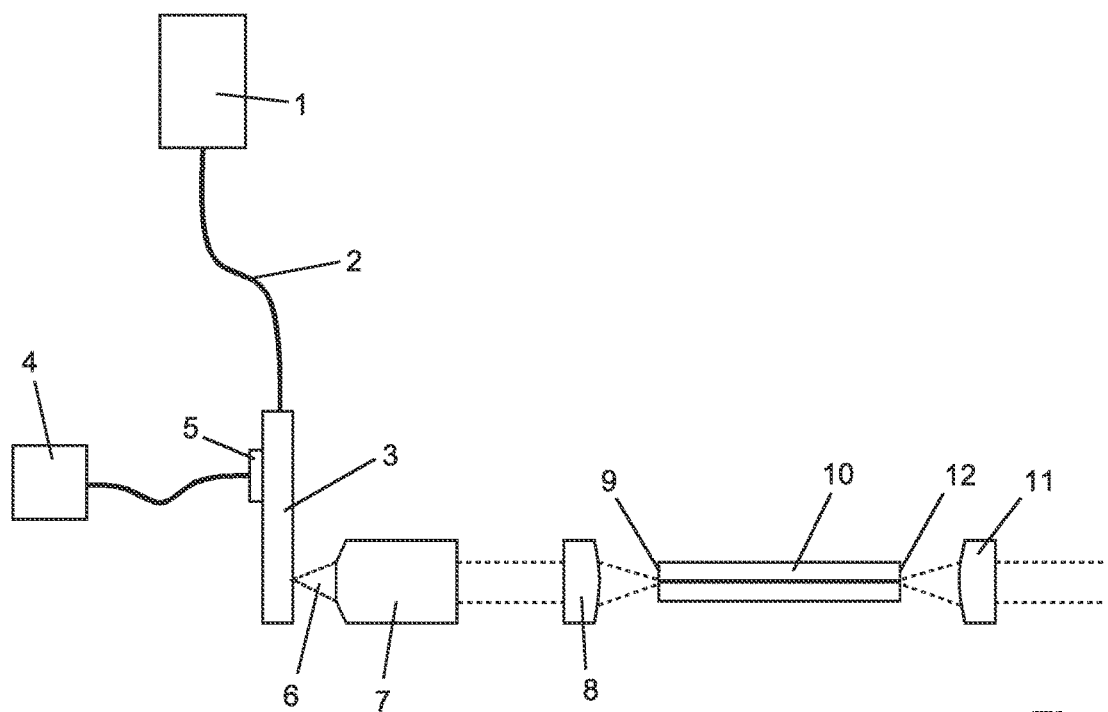
FIG. 1: is a schematic view of an optical device comprising an integrated optical circuit, in the form of a block diagram.

FIG. 1 is a schematic view of an optical device according to the invention, shown as a block diagram. A laser light source 1 is connected, via an optical fiber 2 (single mode fiber), to the input of an integrated optical circuit 3 (PIC). The input radiation generated by the laser light source 1 passes through the PIC and is modulated therein, as will be described in greater detail below, with reference to FIG. 2. For this purpose, the PIC 3 is actuated by a controller 4 which is connected to the PIC 3 via the electrical interface 5 thereof. After passing through the PIC 3, the radiation leaves the PIC 3 at 6. By means of an objective 7 and a convex lens 8, the radiation is directed to the input 9 of a multimode waveguide in the form of a multimode fiber (MMF) 10, i.e. onto the core region thereof, and thus coupled into the MMF 10. After propagation through the MMF 10, the radiation is coupled out by means of a further lens 11 at the output 12 thereof, as an output beam 13.

In the device shown, the PIC 3 ensures that temporally variable interference patterns of the coupled radiation are generated at the input 9 of the MMF 10. On account of the temporally varying interference patterns, the geometry of the coupling of the radiation into the MMF 10 changes over time, as a result of which the excitation of the different modes in the MMF 10 varies accordingly. Consequently, the interference pattern of the modes propagating during the propagation of the radiation through the MMF 10 also varies in a temporal manner. Temporal integration during the detection of the radiation 13 coupled out of the MMF 10 results in a homogeneous beam profile, and specifically on account of the averaging of the temporally varying patterns.

Figure 2:
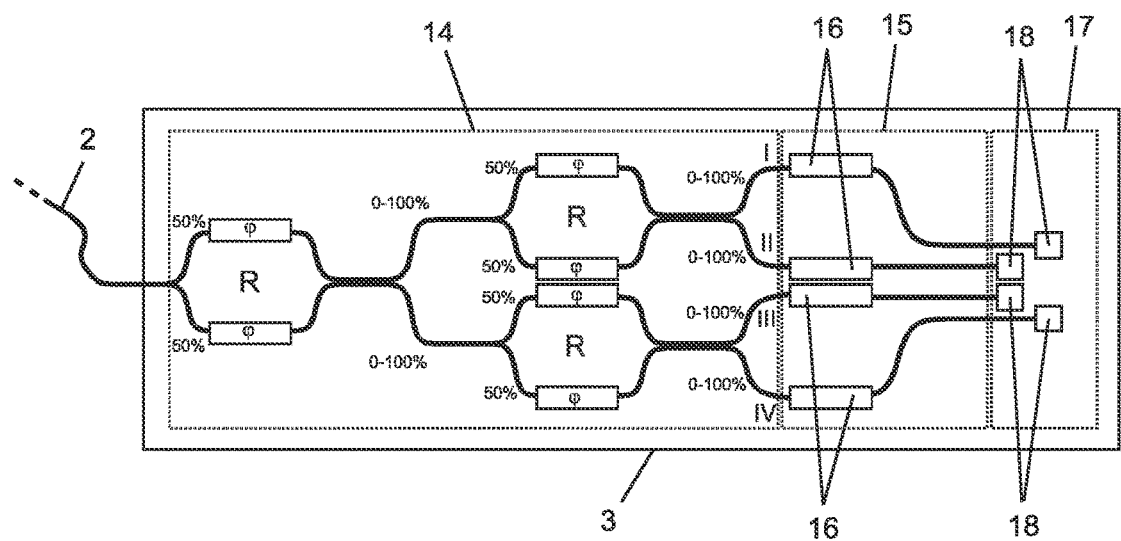
FIG. 2: is a schematic view of the integrated optical circuit of the embodiment of FIG. 1, in a first variant.

The structure of the PIC 3 is shown schematically, by way of example, in FIG. 2. The PIC 3 comprises a splitting device 14 which is designed to split the input radiation, supplied via the fibers 2 connected to the PIC 3, over two or more (four in the embodiment shown) beam paths I-IV. The splitting device 14 is formed by integrated optical waveguide structures (indicated in FIG. 2 by thick black lines) of the PIC 3. The splitting device 14 comprises electrically actuatable directional couplers R which are one behind the other in the beam path and are connected in parallel. Each directional coupler R comprises a beam splitter at the input side, which splits the incoming radiation over two branches, in a 50/50 ratio. An electrically actuatable phase controller (indicated by the letter φ) is located in each branch. The two branches of each directional coupler couple in succession with one another, such that the splitting of the radiation over the two outputs of each directional coupler can be variably controlled in the range of 0-100% in each case. The arrangement of the three directional couplers R, as shown in FIG. 2, results in a variable splitting of the input radiation over four beam paths I-IV, depending on the actuation of the phase controller of the directional couplers R. The four beam paths I-IV, indicated at 15, are also formed in each case by an optical waveguide portion of the PIC 3. Each of the beam paths I-IV comprises a phase modulator 16 as a modulator, which phase modulator is formed by an electrical resistance heating member which is associated with the relevant optical waveguide portion and is integrated into the PIC 3. According to the invention, the beam paths I-IV are combined by superimposing the modulated radiation onto the input 9 of the MMF 10 (FIG. 1), where the radiation forms a temporally variable interference pattern. For this purpose, a superimposition device is provided which, in the embodiment shown, comprises, in addition to the objective 7 and the lens 8 (FIG. 1), an arrangement 17 of two or more, in this case four, mirrors 18, which are integrated into the PIC 3 as micromirrors. In this case, each of the beam paths I-IV is associated with an individual mirror 18 which couples the radiation emerging from the optical waveguide portion of the relevant beam path I-IV out of the PIC 3.

Varying the splitting of the input radiation over the four beam paths I-IV by means of the splitting device 14, and specifically by means of corresponding electrical actuation of the directional couplers R by the controller 4, makes it possible for different spatial interference patterns to be generated at the input 9 of the MMF 10 in rapid temporal succession, e.g. stripe patterns having differently oriented stripes, or checkerboard patterns, depending on the splitting ratios of the directional couplers R and the geometry of the mirror arrangement 17. The interference pattern can be further modified by phase modulation in the beam paths I-IV, e.g. the position of the interference stripes or the fields of the checkerboard pattern can be changed by varying the relative phase length of the radiation in the different beam paths I-IV. The excitation of the different modes in the MMF 10 changes correspondingly over time, and use is made of this by corresponding averaging for homogenization of the beam profile in the output beam 13.

Figure 3:
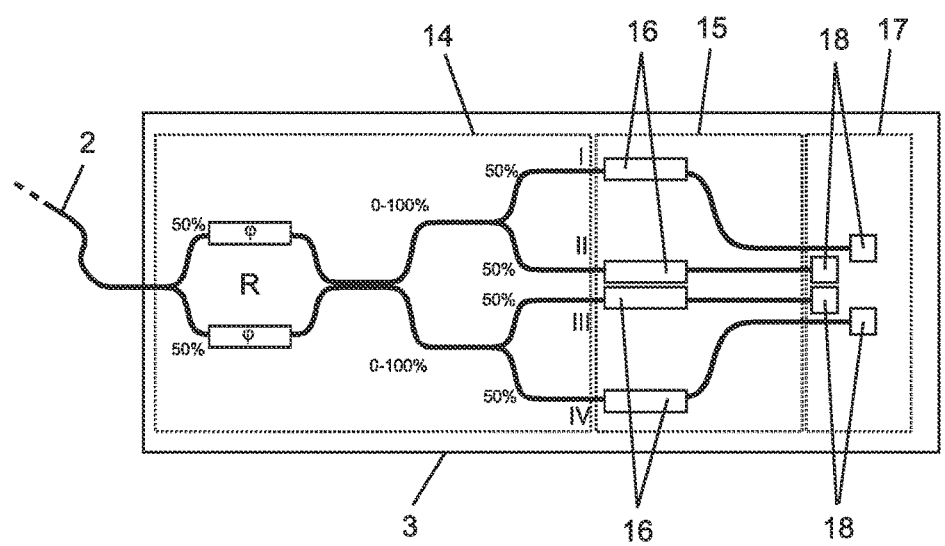
FIG. 3: is a schematic view of the integrated optical circuit of the embodiment of FIG. 1, in a second, simplified variant.

FIG. 3 shows, again schematically and by way of example, a simplified variant of the PIC 3 for use in the device of FIG. 1. The variant of FIG. 3 differs from that of FIG. 2 only by the design of the splitting device 14. Said device comprises just one directional coupler R at the input, followed by two 50/50 beam splitters, in order to split the input radiation, supplied via the fiber 2, over the four beam paths I-IV. The number of interference patterns which can be generated is correspondingly smaller in this variant. However, combining the variation of the splitting ratio by means of the directional coupler R and the phase modulation in the four beam paths I-IV makes it possible, in the case of this variant too, to already achieve a homogenization of the output beam profile 13 of the MMF 10 which is sufficient for most applications.

Using the integrated optics of the PIC 3 is advantageous in that the components required for generating the varying interference patterns can be combined in a component part in a very compact and robust manner. At the same time, the entire device makes do without mechanically movable parts. Very high modulation frequencies can be achieved, ultimately on account of the miniaturization of the photonic integrated components in the PIC 3, such that the output beam profile is homogeneous even at short integration times.

What is claimed is:

1. Method for homogenization of the output beam profile of a multimode optical waveguide, comprising the following method steps:
   splitting an input radiation of coherent light into two or more beam paths,
   modulating the radiation in at least one of the beam paths,
   combining the beam paths by bringing the radiation of the different beam paths into interference onto the input of the multimode waveguide, where the radiation forms a temporally variable interference pattern, and
   propagating the radiation using the multimode waveguide.

2. Method according to claim 1, comprising the further method step of: coupling the radiation out of the multimode waveguide as an output beam.

3. Method according to claim 1, wherein the modulation is phase and/or intensity modulation.

4. Method according to claim 1, wherein the ratio of the splitting of the input radiation into the different beam paths is temporally variable.

5. Method according to claim 1, wherein the modulation frequency and/or the frequency of the variation of the splitting ratio is at least 100 Hz.

6. Method according to claim 1, wherein the modulation frequency and/or the frequency of the variation of the splitting ratio are larger than the inverse integration time of a detector which acquires the output beam.

7. Method according to claim 1, wherein the modulation frequency and/or the frequency of the variation of the splitting ratio is at least 10 kHz.

8. Optical device, comprising
   a splitting device which is designed to split input radiation of coherent light into two or more beam paths,
   at least one modulator which is designed for modulating the radiation in at least one of the beam paths,
   a multimode optical waveguide, and
   a superimposition device which is designed for combining the beam paths by bringing the radiation of the different beam paths into interference and for directing the interfering radiation onto the input of the multimode optical waveguide, where the radiation forms a temporally variable interference pattern.

9. Optical device according to claim 8, comprising
   an outcoupling optics which is designed to couple the radiation out of the multimode optical waveguide, after propagation therethrough, as an output beam.

10. Optical device according to claim 8, wherein the splitting device, the at least one modulator, and at least parts of the superimposition device are components of a photonic integrated circuit.

11. Optical device according to claim 10, wherein the splitting device is formed by an optical waveguide structure of the photonic integrated circuit.

12. Optical device according to claim 10, wherein the splitting device is formed by one or more electrically actuatable, directional couplers which are arranged one behind the other in the beam path and/or are connected in parallel.

13. Optical device according to claim 12, wherein a controller which is electrically connected to the photonic integrated circuit is provided, which controller is designed to actuate the at least one directional coupler and/or an electrical resistance heating members of at least one phase modulators.

14. Optical device according to claim 10, wherein the beam paths are in each case formed by an optical waveguide portion of the photonic integrated circuit.

15. Optical device according to claim 14, wherein each of the beam paths comprises a phase modulator as a modulator, which phase modulator is formed by an electrical resistance heating member, which is associated with the relevant optical waveguide portion, of the integrated photonic circuit.

16. Optical device according to claim 15, wherein a controller which is electrically connected to the photonic integrated circuit is provided, which controller is designed to actuate the at least one directional coupler and/or the electrical resistance heating members of the phase modulators.

17. Optical device according to claim 10, wherein the superimposition device comprises an arrangement of two or more exit apertures of the photonic integrated circuit, wherein each of the beam paths is associated with at least one exit aperture which couples the radiation out of the photonic integrated circuit at the end of the optical waveguide portion of the relevant beam path.

18. Optical device according to claim 17, wherein the mode field diameter of the multimode waveguide is larger than the dimensions of the arrangement of the exit apertures of the photonic integrated circuit.

19. Optical device according to claim 8, wherein the multimode waveguide (10) has a mode field diameter of at least 20 μm.

20. Optical device according to claim 8 wherein the multimode waveguide (10) has a mode field diameter of at least 100 μm.

* * * * *